US009778414B2

(12) United States Patent
Richards

(10) Patent No.: US 9,778,414 B2
(45) Date of Patent: Oct. 3, 2017

(54) CURVED ELECTRONIC DISPLAY ELEMENT

(71) Applicant: Oculus VR, LLC, Menlo Park, CA (US)

(72) Inventor: Evan M. Richards, Santa Clara, CA (US)

(73) Assignee: Oculus VR, LLC, Menlo Park, CA (US)

( * ) Notice: Subject to any disclaimer, the term of this patent is extended or adjusted under 35 U.S.C. 154(b) by 18 days.

(21) Appl. No.: 15/137,739

(22) Filed: Apr. 25, 2016

(65) Prior Publication Data

US 2016/0320559 A1    Nov. 3, 2016

Related U.S. Application Data

(60) Provisional application No. 62/153,821, filed on Apr. 28, 2015.

(51) Int. Cl.
*G02B 6/06* (2006.01)
*G02B 27/01* (2006.01)
*G02B 6/32* (2006.01)

(52) U.S. Cl.
CPC ............. *G02B 6/06* (2013.01); *G02B 6/32* (2013.01); *G02B 27/0172* (2013.01); *G02B 2027/011* (2013.01)

(58) Field of Classification Search
CPC .............. G02B 27/017; G02B 27/0172; G02B 27/4205; G02B 27/0081; G02B 2027/0123
See application file for complete search history.

(56) References Cited

U.S. PATENT DOCUMENTS 6,215,593 B1 *  4/2001  Bruce ..................... G02B 6/08
                                                    359/619
2016/0240013 A1 *  8/2016  Spitzer .................. G06F 3/013

* cited by examiner

*Primary Examiner* — Ryan Lepisto
*Assistant Examiner* — Erin Chiem
(74) *Attorney, Agent, or Firm* — Fenwick & West LLP

(57) ABSTRACT

A head-mounted display (HMD) including an electronic display. The electronic display is configured to output image light. The electronic display includes a display panel including a surface configured to emit image light, and a fiber optic taper. The fiber optic taper includes a mounting surface and a display surface. The mounting surface is formed to, and affixed to, the surface of the display panel to receive the image light from the display panel. The display surface has a shape configured to output the image light corrected for optical distortion in the image light received from the cylindrically curved display panel. The HMD includes an optics block configured to optically direct the corrected image light to an exit pupil of the HMD corresponding to a location of an eye of a user of the HMD.

18 Claims, 5 Drawing Sheets

CURVED ELECTRONIC DISPLAY ELEMENT

CROSS-REFERENCE TO RELATED APPLICATIONS

This application claims the benefit of prior U.S. Provisional Patent Application No. 62/153,821, filed Apr. 28, 2015, the disclosure of which is hereby incorporated by reference in its entirety.

BACKGROUND

The present disclosure generally relates to correcting for optical aberrations using curved electronic displays, and specifically relates to using display surfaces shaped to correct for certain optical aberrations.

Electronic display panels are typically flat, and as a result optics that transmit light emitted from flat electronic display panels may introduce field curvature errors into the transmitted light. Field curvature is an optical aberration that causes a flat object to appear sharp only in a certain part(s) of the frame, instead of being uniformly sharp across the frame. Conventionally additional optical components are used to correct for field curvature at an expense of increased complexity, weight, and/or cost.

SUMMARY

A curved electronic display is configured to output image light corrected for optical distortion. The curved electronic display includes a display panel (e.g., organic light emitting diode display) and a fiber optic taper. The display panel may be cylindrically curved. In some embodiments, the display panel is flat. The fiber optic taper is a coherent fiber optic plate (bundle of fibers) that receives image light via an input surface (also referred to as a mounting surface) and transmits the received light to its output surface (also referred to as a display surface) that is shaped to optically correct and output the transmitted light. The mounting surface is formed to, and affixed to, a surface of the display panel to receive the image light from the display panel. The display surface has a shape configured to output the image light corrected for optical distortion in the image light received from the display panel. For example, the output surface of the fiber optic taper may be shaped to correct for field curvature (also known as Petzval field curvature).

In some embodiments, the curved electronic display is part of a HMD. The HMD includes the curved electronic display and an optics block. The HMD may be configured for use in virtual reality (VR) applications, augmented reality (AR) applications, mixed reality (MR) applications, or some combination thereof. The optics block is configured to optically direct corrected image light received from the curved electronic display to an exit pupil of the HMD corresponding to a location of an eye of a user of the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
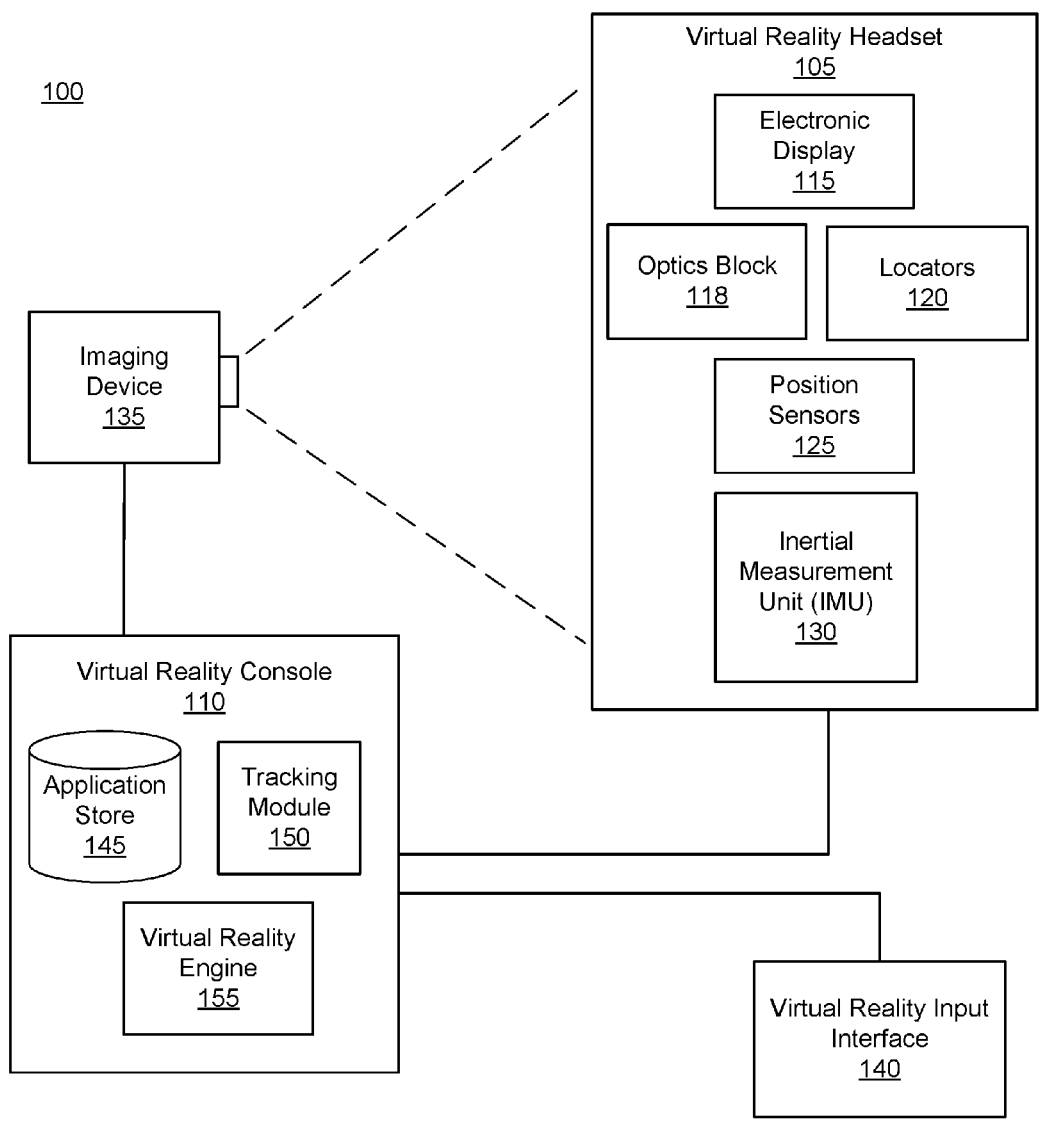
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset and/or a mixed reality (MR) headset. In these embodiments, the VR headset 105 augments views of a physical, real-world environment with computer-generated content (e.g., images, video, sound, etc.).

The VR headset 105 includes a curved electronic display 115, an optics block 118, one or more locators 120, one or more position sensors 125, and an inertial measurement unit (IMU) 130. The curved electronic display 115 displays images to the user in accordance with data received from the VR console 110. In various embodiments, the curved electronic display 115 may comprise a single curved electronic display element or multiple curved electronic displays elements (e.g., a display for each eye of a user).

As discussed in detail below with regard to FIGS. 3A-B and 4A-C, a curved electronic display element is comprised of an electronic display panel that is affixed to a fiber optic taper. The electronic display panel may be flat, cylindrically curved, or have some other shape. Examples of the electronic display panel include: a liquid crystal display (LCD), an organic light emitting diode (OLED) display, an active-matrix organic light-emitting diode display (AMOLED), some type of display flexible display, or some combination thereof.

The fiber optic taper is a coherent fiber optic plate (bundle of fibers) that receives image light via its input surface (also referred to as a mounting surface) and transmits the received light to its output surface (also referred to as a display surface) that is shaped to optically correct and output the transmitted light. The input surface is formed to coincide with a display surface of the electronic display panel, such that input surface of the fiber optic taper is affixed to the display surface of the electronic display panel. For example, if the display surface is flat, the input surface is flat, if the display surface is cylindrically convex, the input surface is cylindrically concave, etc. The output surface of the fiber optic taper is shaped to correct for field curvature (also known as Petzval field curvature). Field curvature is an optical aberration that causes a flat object to appear sharp only in a certain part(s) of the frame, instead of being uniformly sharp across the frame. An example of field curvature is a flat object normal to an optical axis of an optical system that cannot be brought into focus on a flat image plane, but can be brought into focus using some other non-flat image plane. More generally, field curvature is a result of a focal distance of an optics system not perfectly aligning with all the points on a focal plane. This may occur when the focal plane is not flat, but is curved in some manner (e.g., spherical) due, for example, use of non-ideal shaped optical elements in the optical system (e.g., use of spherical surfaces). In some embodiments, field curvature is removed if the shape of the output surface of the fiber optic taper corresponds to the shape of the focal plane of the optical system. Additionally, in some embodiments, one or more other optical aberrations may be removed and/or mitigated by adjusting the shape of the output surface of the fiber optic taper. The shape of the output surface of the fiber optic taper may be, for example, spherically convex, a rotationally symmetric asphere, a freeform shape, or some other shape that removes field curvature. The fiber optic taper outputs the image light via the output surface whose shape is such that the outputted image light is corrected for field curvature, and in some embodiments, one or more additional optical aberrations (e.g., barrel, pincushion, keystone, etc.).

In some embodiments, a masking element may be coupled to an output surface of the fiber optic taper. The masking element is configured to at least in part obscure a fiber optic structure of the fiber optic taper, a pixel structure of an electronic display panel, or some combination thereof. The fiber optic structure refers to the bundle of fibers which make up the output surface of the fiber optic taper. Without obscuration, under certain circumstances (e.g., high magnification) individual fibers in the fiber optic taper may be resolvable by a viewing user. Likewise, under certain circumstances (e.g., high magnification) a viewing user may be able to resolve dark spaces between individual pixels such that a pixel structure is resolvable by a user (also referred to as a screen door effect). The masking element may be, e.g., a filter, a surface texture, a diffractive element, some other type of optical element that obscures fiber optic structure, some other type of optical element that obscures pixel structure, or some combination thereof. Such obscuration mitigates chances of fiber structure and/or pixel structure becoming apparent to a user in the displayed image.

The optics block 118 magnifies received light from the curved electronic display 115, corrects optical aberrations associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the curved electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the curved electronic display 115, which magnifies the image light projected by the curved electronic display 115. Additionally, in some embodiments, the amount of magnification may be adjusted by adding or removing optical elements.

The optics block 118 may be designed to correct one or more types of optical aberration. Examples of optical aberration include: two dimensional optical aberrations, three dimensional optical aberrations, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical aberration. Three dimensional errors are optical aberrations that occur in three dimensions. Example types of three dimensional errors include spherical aberration, comatic aberration, field curvature, astigmatism, or any other type of three-dimensional optical aberration. Note, the optics block 118 may be less complex, cheaper, and lighter, because it does not have to account for field curvature—which is corrected for by the shape of the output surface of the fiber optic taper. In some embodiments, content provided to the curved electronic display 115 for display is pre-distorted, and the optics block 118 corrects the distortion when it receives image light from the curved electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
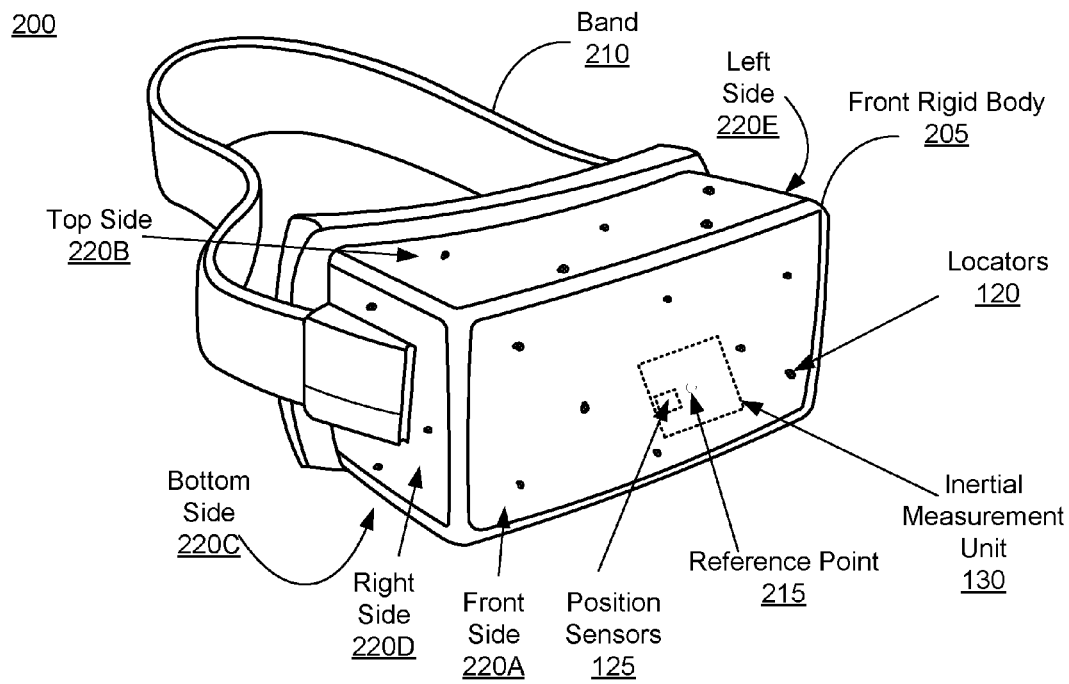
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the curved electronic display 115 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
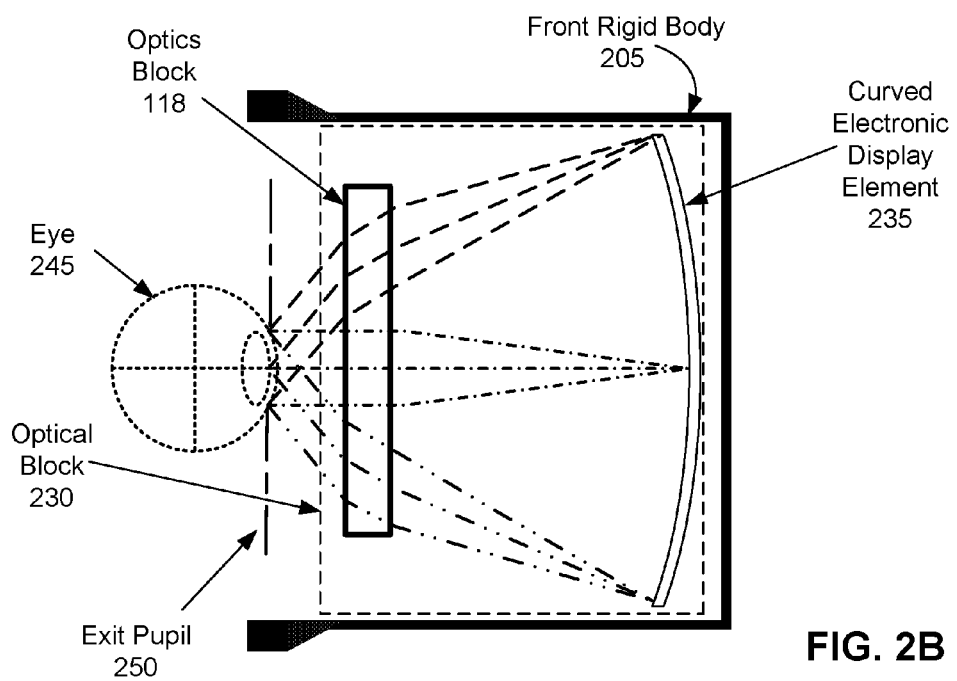
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes a curved electronic display element 235 of the curved electronic display 115, and the optics block 118. The curved electronic display element 235 is comprised of one or more electronic display panels and one or more fiber optic tapers. The electronic display panels may be, e.g., flat panels, cylindrically curved panels, or spherically curved panels. The electronic display panels include a panel mounting surface and a panel display surface. The panel mounting surface of the electronic display panel couples to the front rigid body 205. The panel display surface emits image light.

The one or more fiber optic tapers each include an input surface (also referred to as a mounting surface of the fiber optic taper) and an output surface (also referred to as a display surface of the fiber optic taper). The input surface is formed to, and affixed to, the panel display surface. The input surface receives the image light from the panel display surface and transmits the image light to the output surface of the fiber optic taper. The output surface of the fiber optic taper has a shape configured to output the image light corrected for field curvature. Additionally, in some embodiments, the display surface of the fiber optic taper may have a shape configured to correct for, in addition to field curvature, one or more other forms of optical aberration.

The curved electronic display element 235 emits image light toward the optics block 118. The optics block 118 magnifies the image light, and in some embodiments, also corrects for one or more additional optical aberrations (e.g., astigmatism, etc.). As the image light received from the curved electronic display element 235 is already corrected for field curvature, the optics block 118 does not have to correct for this optical aberration, and accordingly, may be simpler, lighter, and/or cheaper than systems including optical elements designed to correct for field curvature. The optics block 118 directs the image light to the exit pupil 250 for presentation to the user.

Figure 3A:
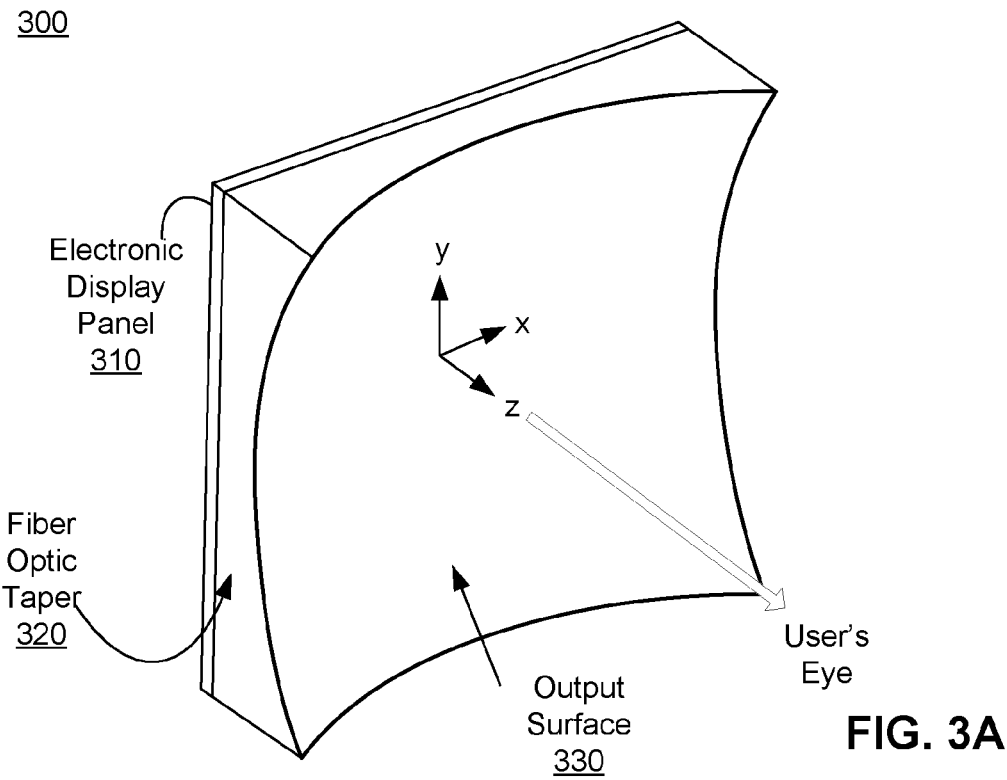
FIG. 3A is an example curved electronic display element, in accordance with an embodiment.

FIG. 3A is an example curved electronic display element 300, in accordance with an embodiment. In some embodiments, the curved electronic display element 300 is part of the curved electronic display 115 of the VR headset 105. In other embodiments it is part of some other electronic display, e.g., heads up display, digital microscope, etc.

The curved electronic display element 300 includes an electronic display panel 310 and a fiber optic taper 320. The electronic display panel 310 is flat. An input surface (also referred to as a mounting surface) of the fiber optic taper 320 is formed to, and affixed to a panel display surface of the electronic display panel 310. In this embodiment, the panel display surface is flat, accordingly, the input surface of the fiber optic taper 320 is also flat. The fiber optic taper 320 includes an output surface 330 (also referred to as a display surface).

The output surface 330 is shaped to correct for field curvature, and in some embodiments, the shape may designed to additionally correct for other forms of optical aberration. In this example, the output surface 330 is shaped to be spherically concave (e.g., a portion of a sphere). However, in other embodiments, the display surface 340 may be a rotationally symmetric asphere, a freeform shape, or some other shape.

In some embodiments (not shown), a masking element may be coupled to the output surface 330. The masking element is configured to at least in part obscure a fiber optic structure in the fiber optic taper 320, a pixel structure of the electronic display panel 310, or some combination thereof.

Figure 3B:
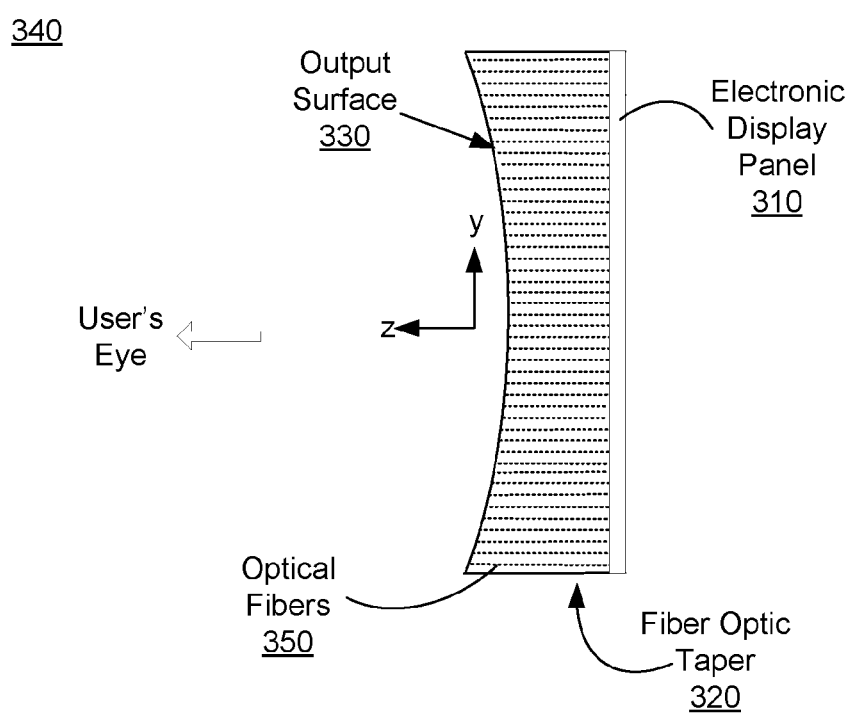
FIG. 3B is a cross section of the curved electronic display element in FIG. 3A, in accordance with an embodiment.

The fiber optic taper 320 includes a plurality of optical fibers. For example, FIG. 3B is a cross section 340 of the curved electronic display element 300 in FIG. 3A, in accordance with an embodiment. The fiber optic taper 320 includes a plurality of optical fibers 350 that receive light from the display panel 310 and output the received light via the output surface 330. In this manner, the curved electronic display element 300 corrects for field curvature by emitting the image light in shape that, for example, coincides with a focal plane of the optical system (e.g., optics block 118).

Figure 4A:
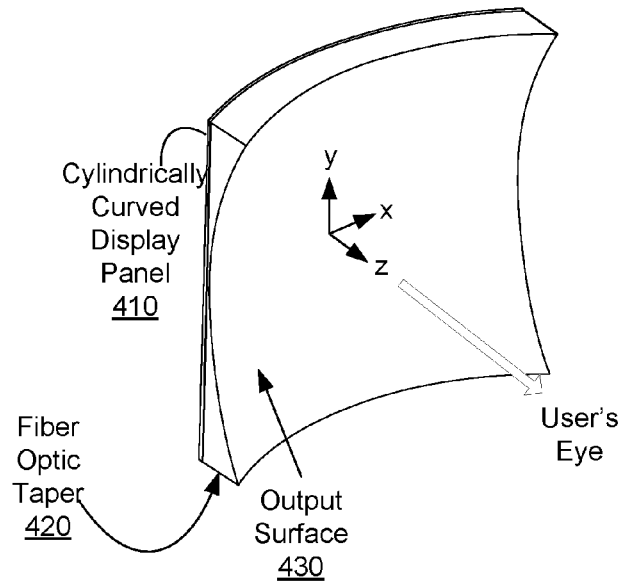
FIG. 4A is a curved display element including a cylindrically curved display panel, in accordance with an embodiment.

FIG. 4A is a curved display element 400 including a cylindrically curved display panel 410, in accordance with an embodiment. In some embodiments, the curved electronic display element 400 is part of the curved electronic display 115 of the VR headset 105. In other embodiments it is part of some other electronic display, e.g., heads up display, digital microscope, etc.

The curved electronic display element 400 includes the cylindrically curved display panel 410 and a fiber optic taper 420. The cylindrically curved display panel 410 includes a cylindrically convex display surface that emits image light. A cylindrically convex input surface (also referred to as a mounting surface) of the fiber optic taper 420 coincides with, and is affixed to, the cylindrically concave panel display surface.

Figure 4B:
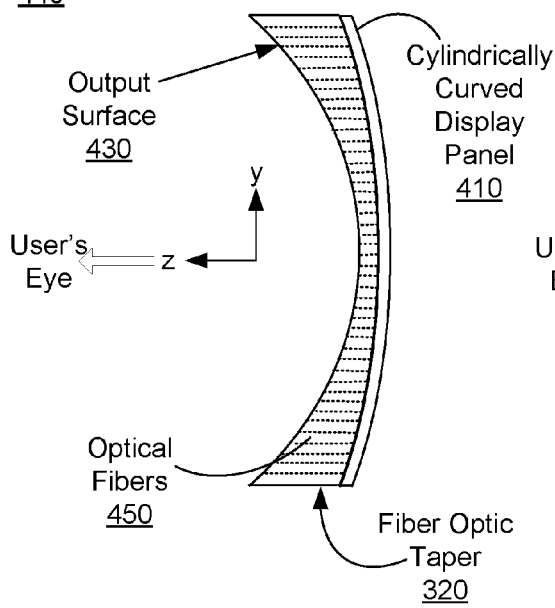
FIG. 4B is a cross section in a y-z plane of the curved electronic display element in FIG. 4A, in accordance with an embodiment.
Figure 4C:
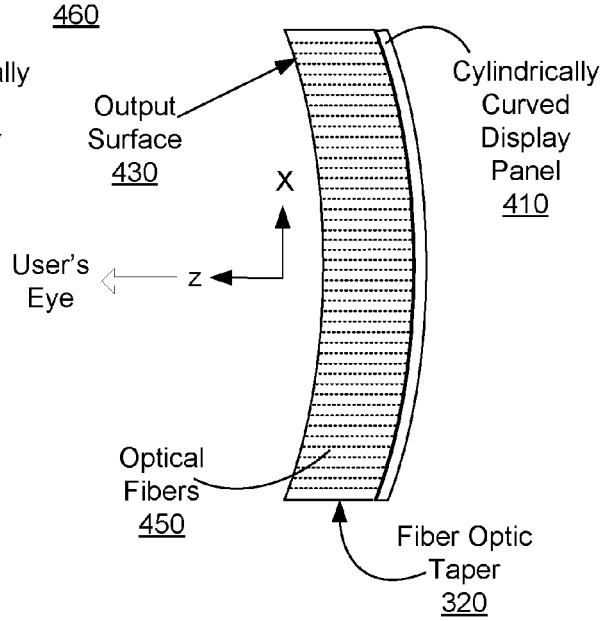
FIG. 4C is a cross section in a x-z plane of the curved electronic display element in FIG. 4A, in accordance with an embodiment.

The fiber optic taper 420 includes an output surface 430 (also referred to as a display surface). The output surface 430 is shaped to correct for field curvature, and in some embodiments, the shape may designed to additionally correct for other forms of optical aberration. In this example, the display surface 330 is shaped to be spherically convex (e.g., a portion of a sphere). However, in other embodiments, the display surface 340 may be a rotationally symmetric asphere, a freeform shape, or some other shape. The fiber optic taper 420 includes a plurality of optical fibers. Due to the shape of the cylindrically curved display panel 410 relative to the flat display panel shown in FIG. 3A, the volume of the fiber optic taper 420 is reduced in comparison to the fiber optic taper 320 in FIG. 3A. For example, FIG. 4B is a cross section in the y-z plane of the curved electronic display element 400 in FIG. 4A, in accordance with an embodiment. And FIG. 4C is a cross section in the x-z plane of the curved electronic display element 400 in FIG. 4A, in accordance with an embodiment. It is apparent from FIG. 4B that that the volume of the fiber optic tapers 420 is substantially reduced in comparison to the same y-z cross section illustrated in FIG. 3B. Similarly, it is apparent from FIG. 4C that the volume of the fiber optic tapers 420 is reduced in comparison to an x-z cross section of the curved electronic display element 300. In fact, the volume of the curved electronic display element 400 is reduced by approximately 43% compared to the electronic display element 300.

A fiber optic taper may be manufactured in a variety of ways. In some embodiments, a block of parallel fibers is modified to become the fiber optic taper. An output surface of the block of fibers is then ground and polished to the desired shape (e.g., spherically concave), and in some embodiments an input surface of the block is also ground and polished to a desired shape (e.g., cylindrically convex). This type of manufacture results in fibers that are parallel to each other, but have varying numerical aperture. Numerical aperture is a measure of light gathering capacity of an optical fiber.

In some embodiments (not shown), a masking element may be coupled to the output surface 430. The masking element is configured to at least in part obscure a fiber optic structure in the fiber optic taper 420, a pixel structure of the electronic display panel 410, or some combination thereof.

Figures 5A, 5B:
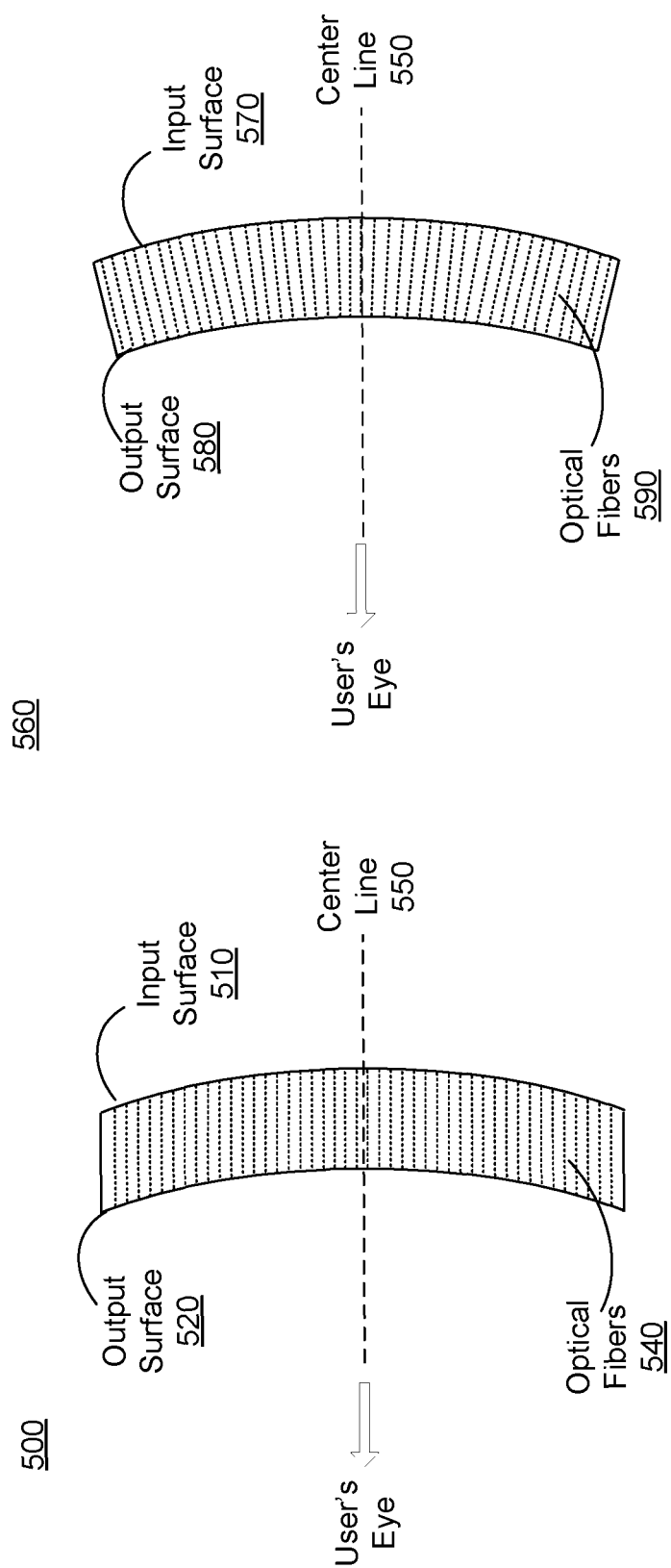
FIG. 5A is a cross section of a fiber optic taper having parallel fibers, in accordance with an embodiment.
FIG. 5B is a cross section of a fiber optic taper having converging fibers, in accordance with an embodiment.

FIG. 5A is a cross section of a fiber optic taper 500 having parallel fibers, in accordance with an embodiment. The fiber optic taper 500 includes an input surface 510 and an output surface 520, and is composed of a plurality of optical fibers 530. The optical fibers 530 are parallel to each other. However, it is apparent an optical fiber along the center line 550 has a smaller amount of the input surface 510 attributed to it per optical fiber than a fiber furthest from the center line 550. Due to the changing surface area of the input surface 510 per each fiber, numerical apertures for the fibers vary with distance from the center line 550.

In another method of manufacture, the fiber optic taper is initially produced as a block of parallel fibers, but is then heated and stretched causing the fibers to become converging, and then the converging fibers are cut. An output surface of the block is then ground and polished to the desired shape (e.g., spherical), and in some embodiments an input surface of the block is also ground and polished to a desired shape (e.g., cylindrical). FIG. 5B is a cross section of a fiber optic taper 560 having converging fibers, in accordance with an embodiment. The fiber optic taper 560 includes an input surface 570 and an output surface 580, and is composed of a plurality of optical fibers 590. The optical fibers 590 are converging toward the center of curvature of the output surface 580 and each have a numerical aperture that is approximately the same as the others. For example, it is apparent an optical fiber along the center line 550 has an input surface that is the same size as a fiber furthest from the center line 550.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:
1. A head-mounted display (HMD) comprising:
a curved electronic display configured to output image light, the curved electronic display including:
a cylindrically curved display panel including at least a cylindrically concave surface configured to emit image light, and
a fiber optic taper including a mounting surface and a display surface, the mounting surface formed to, and affixed to, the cylindrically concave surface of the cylindrically curved display panel to receive the image light from the cylindrically curved display panel, and the display surface having a shape configured to output the image light corrected for optical distortion in the image light received from the cylindrically curved display panel; and
an optics block configured to:

optically direct the corrected image light to an exit pupil of the HMD corresponding to a location of an eye of a user of the HMD.

2. The HMD of claim 1, wherein the optical distortion is field curvature.

3. The HMD of claim 1, wherein the fiber optic taper includes a plurality of parallel optical fibers.

4. The HMD of claim 1, wherein the fiber optic taper includes a plurality of converging optical fibers that converge toward a center of curvature of the display surface.

5. The HMD of claim 1, wherein the shape of the display surface is a portion of a spherically concave shape.

6. The HMD of claim 1, wherein the mounting surface of the fiber optic taper is cylindrically convex and coincides with the cylindrically concave shape of the curved display panel.

7. The HMD of claim 1, further comprising:
a masking element coupled to the display surface, the masking surface obscuring a fiber optic structure of the fiber optic taper.

8. The HMD of claim 1, further comprising:
a masking element coupled to the display surface, the masking surface obscuring a pixel structure of the cylindrically curved display.

9. A head-mounted display (HMD) headset comprising:
a curved electronic display configured to output image light, the curved electronic display including:
a display panel configured to emit image light, and
a fiber optic taper including a mounting surface and a display surface, the mounting surface formed to, and affixed to the display panel to receive the image light from the display panel, and the display surface having a shape that is a portion of a spherically concave shape and is configured to output the image light corrected for optical distortion in the image light received from the display panel; and
an optics block configured to:
optically direct the corrected image light to an exit pupil of the HMD corresponding to a location of an eye of a user of the HMD.

10. The HMD of claim 9, wherein the optical distortion is field curvature.

11. The HMD of claim 9, wherein the fiber optic taper includes a plurality of parallel optical fibers.

12. The HMD of claim 9, wherein the fiber optic taper includes a plurality of converging optical fibers that converge toward a center of curvature of the display surface.

13. A head-mounted display (HMD) comprising:
a curved electronic display configured to output image light, the curved electronic display including:
a cylindrically curved display panel including at least a cylindrically concave surface configured to emit image light, and
a fiber optic taper including a mounting surface and a display surface, the mounting surface formed to, and affixed to, the cylindrically concave surface of the cylindrically curved display panel to receive the image light from the cylindrically curved display panel, and the display surface having a shape configured to output the image light corrected for optical distortion in the image light received from the cylindrically curved display panel; and
an optics block configured to:
optically direct the corrected image light to an exit pupil of the HMD corresponding to a location of an eye of a user of the HMD.

14. The HMD of claim 13, wherein the fiber optic taper includes a plurality of parallel optical fibers.

15. The HMD of claim 13, wherein the fiber optic taper includes a plurality of converging optical fibers that converge toward a center of curvature of the display surface.

16. The HMD of claim 13, wherein the shape of the display surface is a portion of a spherically concave shape.

17. The HMD of claim 13, wherein the mounting surface of the fiber optic taper is cylindrically convex and coincides with the cylindrically concave shape of the curved display panel.

18. The HMD of claim 13, further comprising:
a masking element coupled to the display surface, the masking surface obscuring a fiber optic structure of the fiber optic taper and obscuring a pixel structure of the cylindrically curved display.

* * * * *